United States Patent
Koskela et al.

(10) Patent No.: US 12,273,756 B2
(45) Date of Patent: Apr. 8, 2025

(54) BEAM BASED CRITERIA EVALUATION FOR ADAPTATION OF RRM MEASUREMENTS

(71) Applicant: Nokia Technologies Oy, Espoo (FI)

(72) Inventors: Timo Koskela, Oulu (FI); Jorma Kaikkonen, Oulu (FI); Jussi-Pekka Koskinen, Oulu (FI)

(73) Assignee: Nokia Technologies, Espoo (FI)

( * ) Notice: Subject to any disclaimer, the term of this patent is extended or adjusted under 35 U.S.C. 154(b) by 579 days.

(21) Appl. No.: 17/762,619

(22) PCT Filed: Sep. 17, 2020

(86) PCT No.: PCT/EP2020/075977
§ 371 (c)(1),
(2) Date: Mar. 22, 2022

(87) PCT Pub. No.: WO2021/058369
PCT Pub. Date: Apr. 1, 2021

(65) Prior Publication Data
US 2022/0353722 A1 Nov. 3, 2022

Related U.S. Application Data

(60) Provisional application No. 62/907,306, filed on Sep. 27, 2019.

(51) Int. Cl.
*H04B 7/0408* (2017.01)
*H04B 7/06* (2006.01)
*H04W 24/10* (2009.01)

(52) U.S. Cl.
CPC .......... *H04W 24/10* (2013.01); *H04B 7/0408* (2013.01); *H04B 7/0617* (2013.01); *H04B 7/0693* (2013.01)

(58) Field of Classification Search
CPC .................. H04B 7/0408; H04B 7/0617
See application file for complete search history.

(56) References Cited

U.S. PATENT DOCUMENTS

2017/0034730 A1    2/2017  Zhang et al.
2017/0207843 A1*   7/2017  Jung .................. H04W 74/006
(Continued)

FOREIGN PATENT DOCUMENTS

CN       110036677 A     7/2019
KR       2017-0093071 A  8/2017
(Continued)

OTHER PUBLICATIONS

Office Action received for corresponding Chinese Patent Application No. 202080081932.7, dated Jul. 7, 2024, 6 pages of Office Action and no page of translation available.
(Continued)

*Primary Examiner* — Salvador E Rivas
(74) *Attorney, Agent, or Firm* — Barta Jones, PLLC

(57) ABSTRACT

According to a first embodiment, an apparatus may include at least one processor and at least one memory including computer program code. The at least one memory and the computer program code can be configured to, with the at least one processor, cause the apparatus to at least determine at least one reference value configured to evaluate at least one beam change condition based on at least one measurement. The at least one memory and the computer program code can be further configured to, with the at least one processor, cause the apparatus to at least determine whether at least one beam has changed. The at least one memory and the computer program code can be further configured to, with the at least one processor, cause the apparatus to at
(Continued)

least, upon determining that the at least one timer T has expired, determine that the at least one beam change condition has been fulfilled.

20 Claims, 4 Drawing Sheets

(56) References Cited

U.S. PATENT DOCUMENTS

| | | | | |
|---|---|---|---|---|
| 2017/0251518 | A1* | 8/2017 | Agiwal | H04W 76/28 |
| 2018/0199328 | A1 | 7/2018 | Sang et al. | |
| 2018/0205469 | A1* | 7/2018 | Nagaraja | H04W 24/02 |
| 2019/0254110 | A1 | 8/2019 | He et al. | |
| 2019/0319686 | A1* | 10/2019 | Chen, IV | H04B 7/0639 |
| 2021/0345191 | A1* | 11/2021 | Da Silva | H04W 74/04 |

FOREIGN PATENT DOCUMENTS

| | | |
|---|---|---|
| TW | 201927019 A | 7/2019 |
| WO | 2017/123060 A1 | 7/2017 |
| WO | 2017/138869 A1 | 8/2017 |
| WO | 2019/142165 A1 | 7/2019 |
| WO | 2020/089513 A1 | 5/2020 |

OTHER PUBLICATIONS

"New WID: UE Power Saving in NR", 3GPP TSG RAN Meetings #84, RP-191607, Agenda: 9.4.6, CATT, Jun. 3-6, 2019, 5 pages.
"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.
"3rd Generation Partnership Project; Technical Specification Group Radio Access Network; NR; Physical layer measurements (Release 15)", 3GPP TS 38.215, V15.5.0, Jun. 2019, pp. 1-16.
"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.4.0, Jun. 2019, pp. 1-55.
"3rd Generation Partnership Project; Technical Specification Group Radio Access Network; NR; Physical layer procedures for data (Release 15)", 3GPP TS 38.214, V15.6.0, Jun. 2019, pp. 1-105.
"UE Power Consumption Reduction in RRM Measurement", 3GPP TSG-RAN WG2 Meeting #105bis, R2-1903206, Agenda: 11.11.5, vivo, Apr. 8-12, 2019, 10 pages.
"Reduction in RRM Measurement with Beam Info", 3GPP TSG-RAN WG2 Meeting #105bis, R2-1903124, Agenda: 11.11.5, CATT, Apr. 8-12, 2019, pp. 1-4.
"On RRM optimization by reducing the number of cell/frequency to be measured", 3GPP TSG-RAN WG2 Meeting 107, R2-1910881, Agenda: 11.11.6, Huawei, Aug. 26-30, 2019, 4 pages.
International Search Report and Written Opinion received for corresponding Patent Cooperation Treaty Application No. PCT/EP2020/075977, dated Dec. 2, 2020, 13 pages.
"Further details on RRM measurement relaxation", 3GPP TSG-RAN WG2 Meeting #108, R2-1915522, Agenda: 6.11.6, Nokia, Nov. 18-22, 2019, 5 pages.
"RRM measurements for UE power saving", 3GPP TSG RAN WG2 Meeting# 107, R2-1909904, Agenda: 11.11.6, Sony, Aug. 26-30, 2019, 3 pages.
Office action received for corresponding Indian Patent Application No. 202247023746, dated Aug. 25, 2022, 7 pages.
Notice of Allowance received for corresponding European Patent Application No. 20775255.1, dated Sep. 24, 2024, 8 pages.

\* cited by examiner

BEAM BASED CRITERIA EVALUATION FOR ADAPTATION OF RRM MEASUREMENTS

RELATED APPLICATION

This application was originally filed as PCT Application No. PCT/EP2020/075977, filed on Sep. 17, 2020, which claims priority from U.S. Provisional Application No. 62/907,306 filed on Sep. 27, 2019, each of which is incorporated herein by reference in its entirety.

FIELD

Various communication systems may benefit from improved radio resource management procedures.

BACKGROUND

3rd Generation Partnership Project (3GPP) radio access network (RAN) #84 specified network-controlled RRM measurement relaxation for user equipment (UE) power saving purposes. For example, relaxation may be applied for both intra-frequency and inter-frequency measurements.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of an apparatus comprises at least one processor and at least one memory including computer program code, the at least one memory and the computer program code being configured to, with the at least one processor, cause the apparatus to at least:
  determine at least one reference value configured to evaluate at least one beam change condition based on at least one measurement;
  determine whether at least one beam has changed; and
  upon determining that at least one timer T has expired, determine that the at least one beam change condition has been fulfilled.

In an example embodiment, alternatively or in addition to the above-described example embodiments, the at least one memory and the computer program code further configured to start the at least one timer T once at least one reference value is obtained, wherein the reference value is based upon at least one measurement configured to derive one or more of at least one cell measurement quantity configured for cell quality derivation and at least one beam index determined to be used for cell quality derivation.

In an example embodiment, alternatively or in addition to the above-described example embodiments, the at least one memory and the computer program code further configured to receive at least one measurement and/or at least one value.

In an example embodiment, alternatively or in addition to the above-described example embodiments, the at least one memory and the computer program code further configured to compare the received at least one measurement and/or at least one value to at least one reference value.

In an example embodiment, alternatively or in addition to the above-described example embodiments, the at least one memory and the computer program code further configured to determine whether the at least one timer T has stopped, has expired, or is running.

In an example embodiment, alternatively or in addition to the above-described example embodiments, wherein the at least one memory and the computer program code further configured to, upon determining that the at least one timer T has stopped, re-determine at least one reference value configured to evaluate at least one beam change condition based on at least one measurement.

In an example embodiment, alternatively or in addition to the above-described example embodiments, the at least one memory and the computer program code further configured to, upon determining that the at least one timer T is running, re-receive at least one measurement and/or at least one value.

An example embodiment of a method comprises steps of determining at least one reference value configured to evaluate at least one beam change condition based on at least one measurement; determining whether at least one beam has changed; and upon determining that at least one timer T has expired, determining that the at least one beam change condition has been fulfilled.

In an example embodiment, alternatively or in addition to the above-described example embodiments, the at least one memory and the computer program code further configured to start the at least one timer T once at least one reference value is obtained, wherein the reference value is based upon at least one measurement configured to derive one or more of at least one cell measurement quantity configured for cell quality derivation and at least one beam index determined to be used for cell quality derivation.

In an example embodiment, alternatively or in addition to the above-described example embodiments, the at least one memory and the computer program code further configured to receive at least one measurement and/or at least one value.

In an example embodiment, alternatively or in addition to the above-described example embodiments, the at least one memory and the computer program code further configured to compare the received at least one measurement and/or at least one value to at least one reference value.

In an example embodiment, alternatively or in addition to the above-described example embodiments, the at least one memory and the computer program code further configured to determine whether the at least one timer T has stopped, has expired, or is running.

In an example embodiment, alternatively or in addition to the above-described example embodiments, the at least one memory and the computer program code further configured to, upon determining that the at least one timer T has stopped, re-determine at least one reference value configured to evaluate at least one beam change condition based on at least one measurement.

In an example embodiment, alternatively or in addition to the above-described example embodiments, the at least one memory and the computer program code further configured to, upon determining that the at least one timer T is running, re-receive at least one measurement and/or at least one value.

An example embodiment of a computer program code may include instructions for performing: determining at least one reference value configured to evaluate at least one beam change condition based on at least one measurement; determining whether at least one beam has changed; and upon determining that at least one timer T has expired, determining that the at least one beam change condition has been fulfilled.

In an example embodiment, alternatively or in addition to the above-described example embodiments, the at least one memory and the computer program code further configured to start the at least one timer T once at least one reference value is obtained, wherein the reference value is based upon at least one measurement configured to derive one or more of at least one cell measurement quantity configured for cell quality derivation and at least one beam index determined to be used for cell quality derivation.

In an example embodiment, alternatively or in addition to the above-described example embodiments, the at least one memory and the computer program code further configured to receive at least one measurement and/or at least one value.

In an example embodiment, alternatively or in addition to the above-described example embodiments, the at least one memory and the computer program code further configured to compare the received at least one measurement and/or at least one value to at least one reference value.

In an example embodiment, alternatively or in addition to the above-described example embodiments, the at least one memory and the computer program code further configured to determine whether the at least one timer T has stopped, has expired, or is running.

In an example embodiment, alternatively or in addition to the above-described example embodiments, the at least one memory and the computer program code further configured to, upon determining that the at least one timer T has stopped, re-determine at least one reference value configured to evaluate at least one beam change condition based on at least one measurement.

In an example embodiment, alternatively or in addition to the above-described example embodiments, the at least one memory and the computer program code further configured to, upon determining that the at least one timer T is running, re-receive at least one measurement and/or at least one value.

BRIEF DESCRIPTION OF THE DRAWINGS

For proper understanding of this disclosure, reference should be made to the accompanying drawings, wherein.

DETAILED DESCRIPTION

Figure 1:
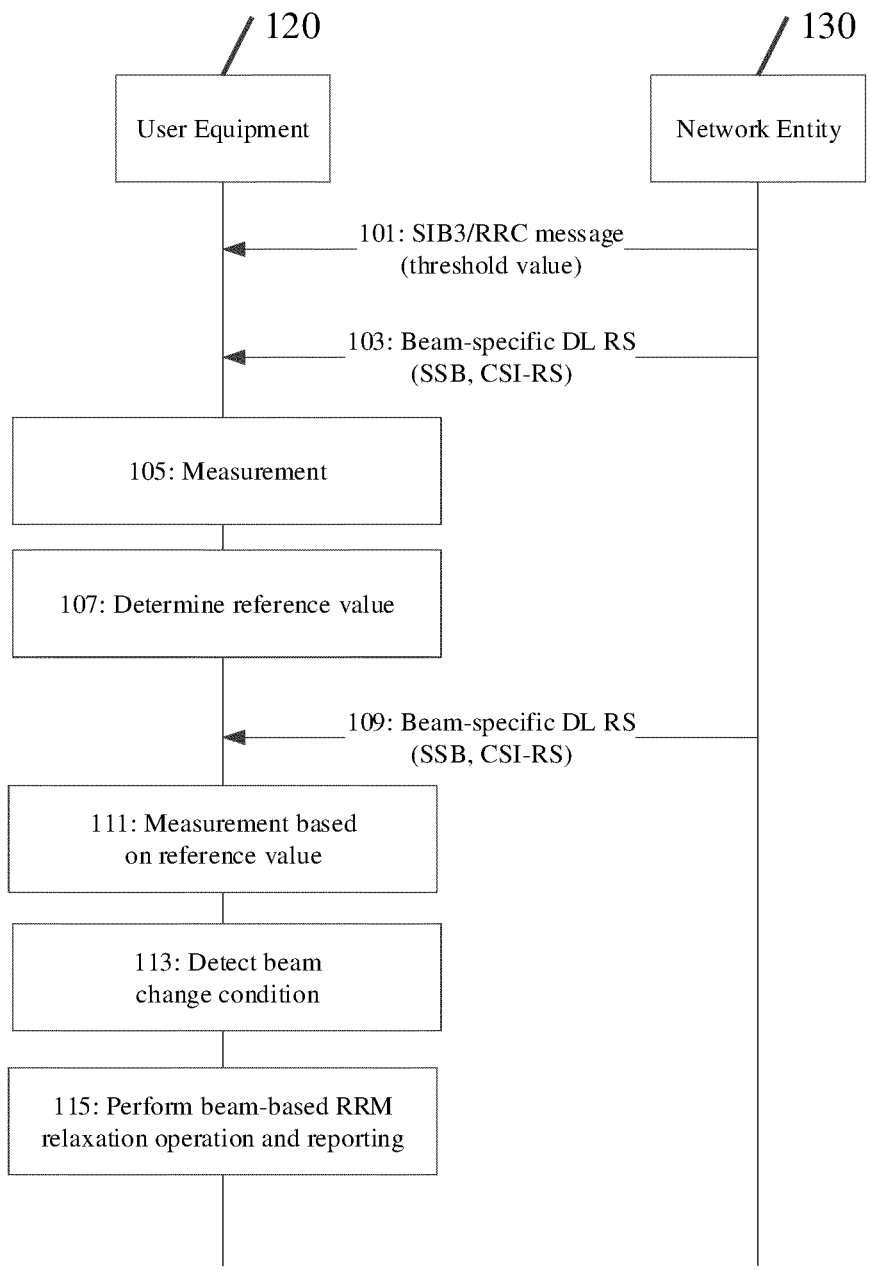
FIG. 1 illustrates an example of a signaling diagram according to certain embodiments.

Under 3GPP new radio (NR), the UE may continuously perform at least intra-frequency RRM measurements, and may be further configured to perform RRM on other layers or types of radio access technology (RAT). Generally, mobility measurements may be for inter-cell mobility, typically referred to radio resource management (RRM) measurements or Layer 3 mobility. RRC signalling may be used for inter-cell mobility RRC. RRC may also be used to configure measurements for synchronization signal block (SSB)-based management, channel state information reference signals (CSI-RS)-based beam management, and/or Layer 1 (L1)-reference signals received power (RSRP) measurements. The SS block may also be referred to as a synchronization signal/PBCH block, wherein the synchronization signal may include a primary synchronization signal and a secondary synchronization signal. Reference signals used for either L3 mobility and/or beam management may be explicitly configured, and RRM measurements may be configured for the UE by the network using, for example, MeasObjectNR information element (IE), as defined in 3GPP technical specification (TS) 38.331. Specifically, MeasObjectNR specifies information applicable for synchronization signals (SS)/physical broadcast channel (PBCH) block intra/inter-frequency and/or CSI-RS intra/inter-frequency measurements.

CSI-RS signals for beam management and L3 mobility purposes may be separately configured, such as the actual signals, measurements, and reporting configurations being independently configured. For beam management purposes, the UE may be configured with one or more non-zero power (NZP)-CSI-RS configurations, while for L3 mobility purposes, the UE may be configured with CSI-RS for Mobility.

In addition, at least one SSB signal may be used for both beam management and L3 mobility. For example, with SSB-based measurements for beam management, the SSB resources configured for L1-RSRP reporting may be explicitly configured, while under current specifications, the SSB-based measurements for L3 mobility may be performed by the UE during an SS/PBCH block measurement time configuration (SMTC). Such an SMTC window may determine a time duration where the UE may expect SSB-time locations, and where the UE performs measurements of any SSBs of any cell on the frequency layer.

As described 3GPP TS 38.215, the measurement time resource(s) for SS-RSRP may be confined within an SMTC window duration. If SS-RSRP is used for L1-RSRP as configured by reporting configurations as defined in 3GPP TS 38.214, the measurement time resources restriction by the SMTC window duration may not apply.

As an example, an SMTC window may define the time duration and periodicity for SSB-based RRM measurements. An SMTC window may be provided to the UE for IDLE mode measurements (SMTC), as well as for the CONNECTED mode with one or two separate SMTC configurations (SMTC1, SMTC2). Only on the serving carrier could the UE be configured with two SMTCs; otherwise, only one SMTC could be configured.

Primary measurement timing configurations (SMTC1) may indicate the periodicity and/or offset value for the SMTC window, as well as the duration of the subframes. In addition, secondary measurement timing configuration (SMTC2) for SSBs may correspond with at least one specific physical cell identifier (PCI) listed in the configuration. For the SSBs indicated in the SMTC1, the second/alternative second periodicity may be indicated by periodicity in SMTC2. Periodicity in SMTC2 may only be set to a value shorter than the periodicity of the SMTC1. Additionally, SMTC1 may be a multiple of SMTC2. As an example, if the SMTC1 periodicity is configured as sf10, the periodicity of SMTC2 may only be set to sf5. SMTC2 may use the offset and duration value of SMTC1.

As described in 3GPP RAN #84, a power saving enhancement in RRM may consider the UE IDLE mode measurements and/or may be triggered. RAN2 resulted in RRM measurements which may be relaxed when specific conditions apply, or a criteria is fulfilled for the UE.

Specifically, measurement relaxation criteria may consider both low mobility and UE location in the cell, such as whether the UE is in a cell edge. The UE may activate relaxed measurement criteria if at least one of the following conditions is satisfied. First, a serving cell measurement may not change more than a relative threshold during a time period. The LTE-relaxed monitoring criteria in 3GPP TS 36.304 may be considered as a baseline, and additional enhancements addressing NR-specific aspects may be considered. Second, the UE may not be a cell edge, where the serving cell/beam RSRP/RSRQ/SINR may be above a threshold.

It was also agreed to include determining whether serving cell measurements change more than a relative threshold during a time period. LTE relaxed monitoring may be used as a baseline operation, where the UE may compare the cell quality (serving cell measurement) to a reference value, and may check if the different is within a threshold value, such as $S_{SearchDeltaP}$. Specifically, under 3GPP TS 36.304, the relaxed monitoring criterion may be fulfilled when $(S_{rxlevRef} - S_{rxlev}) < S_{SearchDeltaP}$. In NR, the cell quality may be derived based on the beam level measurements at RRC, and a single value may be derived based upon multiple beams. Where an absolute threshold is configured, the UE may average the beam measurements of up to N beams that are above the threshold (i.e. the measured values are above a quality threshold such as RSRP, RSRQ, SINR or the like).

The cell quality/serving cell measurements may be used to determine whether the UE can relax the measurements which may be used to determine that the UE is in a low mobility, in a stationary state, or in a state for adapting its operation, such as for power saving, from the RRM measurement perspective. Since the variation of the measurements is low, the assumption is that the radio environment may be considered to be relatively static, and subsequent measurements may have relatively high correlation. However, while the cell quality may provide information to estimate that the UE may be in a low mobility state or in a state where the UE may adapt the measurements, it may not be enough to only consider the derived cell quality since the quality may be relatively static, while the beam measurements may fluctuate. In cell re-selection and IDLE mode mobility cases, it may not be an issue; however, it may not be feasible to determine whether criteria or conditions to relax RRM measurements have been fulfilled.

Certain embodiments described herein may have various benefits and/or advantages to overcome the disadvantages described above. For example, by considering cell quality measurements and beam-based measurements for determining whether a UE can adapt its RRM, this may have the benefit of saving power and providing a more reliable mechanism for determining that the UE is in a low mobility state. In addition, since cell quality may be derived according to one or more beams, individual beam measurements and conditions may provide a better indication of whether the UE can determine that a radio environment is relatively static, or that the UE is in a state when it can adapt its RRM measurements with little or no impact on the mobility performance. Thus, certain embodiments are directed to improvements in computer-related technology.

FIG. 1 illustrates an example of a signaling diagram showing communications between UE 120 and NE 130 for evaluating beam-based condition/criteria. UE 120 may be UE 410, and NE 130 may be NE 420, both illustrated in FIG. 4.

In step 101, NE 130 may transmit at least one SIB, such as at least one SIB3, and/or at least one RRC message to UE 120. In step 103, NE 130 may transmit at least one first beam-specific downlink (DL) reference signal (RS) to UE 120. The first beam-specific DL-RS may include at least one synchronization signal physical broadcast channel (SS/PBCH) block (SSB) and/or at least one CSI-RS.

In step 105, UE 120 may perform at least one measurement. For example, the beam-specific DL RS may comprise at least one synchronization signal physical broadcast channel (SS/PBCH) block, such as for L3 mobility purposes, beam management purposes, and/or CSI-RS purposes, including for L3 mobility and/or beam management.

In step 107, UE 120 may determine at least one reference value based on at least one parameter, such as Srxlev (cell selection RX level value (dB)) and Squal (cell selection quality value), provided by the network. In step 109, NE 130 may transmit at least one second beam-specific DL RS, which may include the at least one SSB and/or at least one CSI-RS to UE 120. In step 111, UE 120 may perform at least one measurement based on the at least one determined reference value. In step 113, UE 120 may detect at least one change in at least one beam condition. In step 115, UE 120 may determine whether to perform at least one of beam-based RRM relaxation operation and/or reporting operation.

In some embodiments, if UE 120 determines that at least one beam change has occurred, UE 120 may continue obtaining additional or new reference values in step 107, and/or may stop/start/restart/continue the at least one timer T.

In some embodiments, the at least one beam may be determined to not be changed if, for example, the beams are not changed for a cell measurement quantity (cell quality or L3 cell quality), such as RSRP, RSRQ, and SINR, derivation for different measurements in comparison to at least one reference value or other measurement. Specifically, this determination may be made if at least one beam index used to derive cell measurement quantity (cell quality) has not changed; if none of the beam indices have changed; if at most N of M beam indices have changed; and may be based upon one or more of any of the measurement within a period of time, a previous measurement within a period of time, the at least one reference value, and the at least one reference value within a period of time. A determination that a beam change has not occurred may also occur when at least one (or N) beam index used to derive the cell quality is the same as in the reference set. To determine whether has or has not changed, the signal quality (in terms of RSRP, RSRQ, SINR or the like) of the beam index or indices may be compared to the threshold value and determined if the quality is above or equal to the threshold. If the value is above (or equal) to the threshold, the beam may be considered not to be changed. In other words, in an example of using one beam (although multiple beam indexes may be considered), if a beam index is used for cell quality derivation (or is above or equal to a threshold) in the reference measurement (or the index is considered as reference value), and the same beam index is used for cell quality derivation (or is above or equal to the threshold) in a measurement that is compared to the reference measurement, the beam index is considered not to have changed. Beam index or indices may refer to downlink signals and their respective identifiers such as SSB index, SSB resource index, SSB time location index, or CSI-RS index/resource identifier or the like.

As an example, in the first measurement or evaluation, UE 120 may determine that beam index (the measured signal quality of the beam index in terms of RSRP, RSRQ, SINR or the like) #1 and #2 are above a threshold and/or are considered as reference values. In the second evaluation, UE 120 may determine that index #1, index #2, and additionally index #3 may be above a threshold and/or are determined to be valid for beam evaluation. Furthermore, UE 120 may determine that a beam change has not occurred. In the third evaluation, UE 120 may determine that only beam index #1 is above the threshold and/or considered in the beam-based evaluation). In some embodiments, UE 120 may determine that a beam change has occurred since not all the beams are the same in the evaluated set compared to the reference set.

In various embodiments, UE 120 may determine that, since at least one index (#1) is the same as the reference set, UE 120 may determine that a beam change has not occurred. When UE 120 determines that a beam change has occurred and/or that a beam-based condition has not been fulfilled, UE 120 may perform at least one of: i) obtain a new reference value based on the latest measurement where it considered that a beam change occurred, ii) obtain of new reference value based on the latest measurement where UE 120 considered that a beam change occurred if the cell based condition is fulfilled, iii) obtain a new reference value based on the latest measurement where UE 120 considered that a cell based condition is fulfilled, and iv) stop/suspend evaluation of beam-based conditions until evaluation is started or restarted.

In certain embodiments, UE 120 may start/restart timer T and/or may continue evaluation of beam-based conditions. Additionally or alternatively, when the beam-based condition is not considered to be fulfilled, UE 120 may need to re-evaluate at least one or all cell-based conditions.

In some embodiments, when UE 120 has determined that, for example, at least one adaptation condition is fulfilled, such as based on cell-based, beam-based, or both conditions), UE 120 may determine that UE 120 is in at least one low mobility state and/or in a state where UE 120 may adapt its operation, such as performing RRM measurements). UE 120 may further determine that UE 120 needs to continue evaluating whether the cell-/beam-based conditions apply, for example, whether UE 120 needs to cancel the adaptation/exit the adaptation state, and UE 120 may start a timer to continue evaluation.

According to various embodiments, UE 120 may determine, based on subsequent measurements/evaluations, whether the beam- or cell-based condition still holds. For example, UE 120 may obtain at least one new reference value when UE 120 has determined that UE 120 can adapt its operation, or UE 120 may use the same reference value that it obtained for the evaluation for the time duration of T initially. Additionally or alternatively, UE 120 may continue evaluation whether the beam-based condition is satisfied or continues to be satisfied. Regarding the beam-based condition, as with the cell-based condition, UE 120 may obtain at least one new reference value when it has determined that UE 120 can adapt its operation (such as relax RRM measurements) or use the same reference value that was initially obtained. In some examples, at least one timer may be used to evaluate the beam/cell-based condition, and additionally or alternatively, UE 120 may evaluate the condition as per subsequent evaluation (for example, the measurement interval used for determining whether a condition is fulfilled), and if one or more measurements or obtained values (e.g. beam indexes/quality or cell quality) differ from the reference values or are considered to be changed, UE 120 may exit the adaptation state. Alternatively, UE 120 may be configured to determine when values, such as beam indexes/quality or cell quality, for N-consecutive or N within a time period have changed, and, based on the determination, exit the low mobility state/measurement adaptation state.

In certain embodiments, UE 120 may be configured with stricter or looser conditions/parameters to detect at least one change in cell/beam condition when UE 120 has determined that UE 120 is allowed/can adapt its operation (such as RRM measurements) and/or be in a low mobility/stationary state.

For example, the cell-based condition may be considered to be fulfilled when cell quality is above a threshold and the cell quality variation (e.g. RSRP value of the cell is not lower (or different) by an offset compared to the reference value e.g. within a time period, and when UE 120 evaluates the exit condition, the offset value may be stricter, specifically, the offset value may be used for comparing the obtained cell quality to the reference may be smaller, where less variation is tolerated, or vice versa. In certain embodiments, the new obtained cell quality value may be compared to the reference value plus the offset (e.g. the variation is determined to be within acceptable range if CellQuality_new<=reference_value+offset) wherein the offset may be positive, negative or zero. Similarly, when evaluating beam-based conditions, when UE 120 has determined that it can adapt, UE 120 may be required to exit the adaptation state if even one beam has changed or is different compared to the reference value. Thus, the criteria may be stricter when evaluating the exit condition. In certain examples, an offset value (which may be an offset used to determine the threshold value or number beam changes, or number of beams that is allowed to be changed) may be similar, stricter or looser, such as where more/fewer beam changes or a higher/lower number of beams which can change may be tolerated. In certain embodiments, an offset value may be applied for the threshold used to determine whether a beam change has occurred, as described in various embodiments. An offset (e.g. in dBs) may be applied to a threshold to change it to be higher or lower (or the same). The offset may be positive, negative, or zero.

In various embodiments, the beam measurements (or the measurements of the evaluation of beam based condition) may be performed independently of the cell quality derivation (or cell based measurement that is used to derive cell quality and determine if cell-based condition for adapting UE operation such as RRM measurements applies) e.g. with higher or lower periodicity or the beam measurements are associated with the measurements used for cell quality derivation. In any of the embodiments, in some cases UE may evaluate the beam-based condition when deriving cell quality and additionally evaluate beam-based condition more frequently. As an example, if UE derives cell quality every 40 ms it may be configured to perform or it may perform beam-based measurements/evaluation every 10 ms and additionally when UE derives the cell quality (every 40 ms). In some examples UE may derive cell quality every 80 ms but independently of the cell quality derivation determine beam-based condition every 10/20/40/80/160 ms. If the beam-based condition is evaluated independently of cell quality derivation or measurements, UE may still use the same parameters "as if" the cell quality would be derived e.g. the used threshold for cell quality derivation would be used, or as in various examples herein a different threshold may be used for beam-based evaluation. The values considered herein are merely example values.

In various embodiments, if there has been at least K beam changes and/or K beam changes within a period of time T after UE 120 has derived the cell measurement quantity (e.g., that may be used as a reference value for a beam change or to determine a reference for a cell based condition evaluation), UE 120 may consider the beam based condition not to be fulfilled, may consider that it cannot adapt/relax measurements, and/or may consider UE 120 not to be in a low/stationary mobility state. In addition, a condition may determine if UE 120 may or may not be considered to be located at a cell edge; alternatively, UE 120 may be considered to be located at a cell edge, and may not be allowed to adapt its operation for power saving (e.g., adapt RRM measurements). In addition, if there has been a maximum of K beam changes and/or K beam changes within a period of time T after UE 120 has derived the cell measurement quantity (e.g., that may be used as a reference value for beam changes and/or to determine reference for cell based condition evaluation), UE 120 may consider the beam-based condition to be fulfilled, consider that it can adapt/relax measurements, and/or consider UE 120 to be in a low mobility state or in a state where it can adapt its operation, such as RRM measurements).

According to some embodiments, the beam change may be determined by UE 120 when at least one beam or N beams have changed compared to the reference value or at least one beam or N beams have changed for M-consecutive evaluation instances compared to the reference value within period of time T (or evaluated without a time period or using alternative timer period $T_{alt}$ for evaluation). In some embodiments, the beam change may be determined not to occur when at least one beam is the same as in the reference set.

According to various embodiments, the timer T used for evaluation of beam-based condition or cell-based condition or both may be an interval for measurements to evaluate the condition, or multiple such intervals.

In some embodiments, at least one condition to evaluate at least one beam-based criteria/condition may require that at least one or all beams configured for deriving at least one cell measurement quantity is with K dB of a highest-measured value. For example, the highest-measured value may need to be above at least one threshold, such as absThreshSS-Blocks Consolidation or other threshold. Additionally or alternatively, all of the beams used to derive the cell quality, and/or considered for evaluation of beam-based conditions, may need to be above at least one predetermined threshold, such as absThreshSS-BlocksConsolidation or other threshold. Finally, at least N beam quantities may be required to be within K dB of at least one highest measured value.

In some embodiments, when determining whether at least one change condition for the beams used for cell measurement quantity derivation has occurred, an alternative or additional threshold value may be used. For example, this alternative or additional threshold value may be derived from absThreshSS-BlocksConsolidation by using an offset, and/or it may be a separately configured or separately set threshold. In various embodiments, when the UE determines that beam change conditions are satisfied, UE 120 may use the threshold to determine which beams are considered in the evaluation, for example, that the beam is above at least one threshold, which may be independent to the absThreshSS-BlocksConsolidation.

Figure 2:
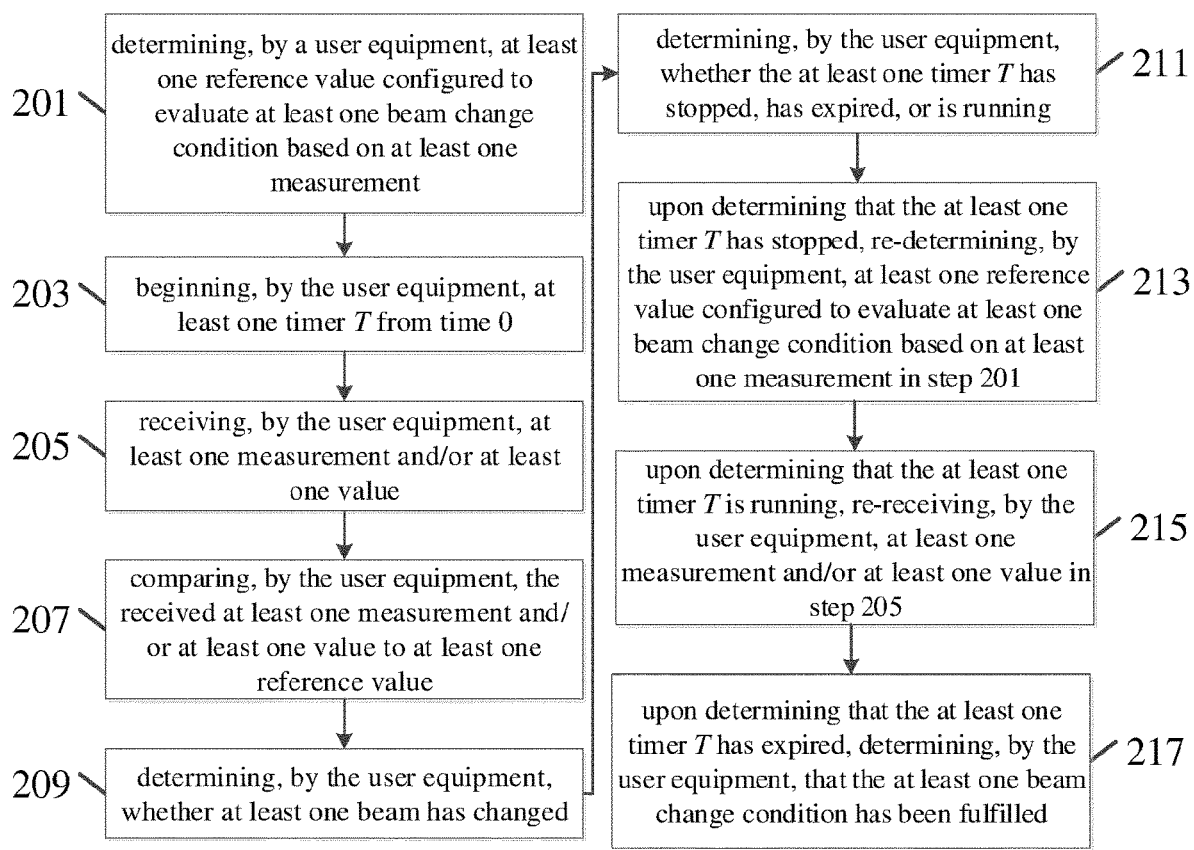
FIG. 2 illustrates an example of a flow diagram of a method that may be performed by a user equipment according to certain embodiments.
Figure 4:
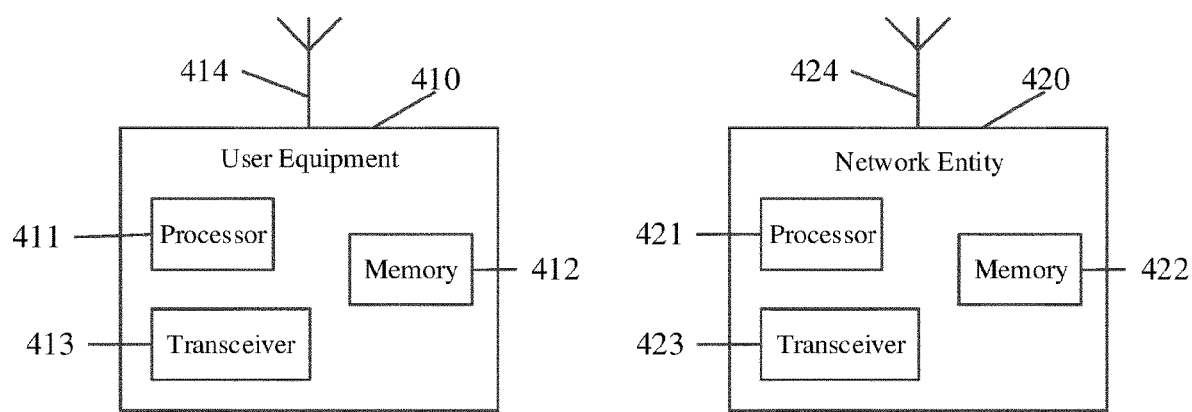
FIG. 4 illustrates an example of a system architecture according to certain embodiments.

FIG. 2 illustrates an example of a flow diagram of a method that may be performed by a UE, such as UE 120 of FIG. 1 or UE 410 illustrated in FIG. 4, to determine when a beam specific criteria for measurement relaxation is fulfilled or a condition can be applied, according to certain embodiments.

In step 201, the UE may determine at least one reference value or value configured to evaluate at least one beam change condition based on at least one measurement occurring during at least one time period. In certain embodiments, the UE may determine the at least one reference value based upon at least one measurement configured to derive one or more of at least one cell measurement quantity configured for cell quality derivation, at least one beam index configured (or determined to be used) for cell quality derivation, a number of beams configured for cell quality derivation (e.g., a maximum number of beams used for cell quality derivation or maximum number of beams above the threshold used for cell quality derivation), a measured quantity of the beams, and any combination thereof. Additionally or alternatively, the UE may store the at least one reference value when, for example, at least one cell-based measurement is determined to be valid and/or at least one criteria configured for cell-based measurements (or cell based condition/criteria for adapting RRM measurements if fulfilled/satisfied) is satisfied. For example, this may be based on at least one cell quantity value above at least one threshold.

In various embodiments, the at least one reference value may be a first measurement configured to obtain one or more of cell quality and/or a first measurement configured to evaluate at least one condition and/or criteria for measurement adaptation/relaxation and/or evaluating the low mobility state (or a state where UE can adapt its RRM measurements or adapt its operation for power saving or for other purpose). At least one reference value and/or at least one measurement configured to obtain at least one reference value may be included in the period of time T configured to evaluate the measurement adaptation state, or the evaluation may be started once the reference value is obtained. For example, it may trigger the start of the time period for evaluations. The reference value may also be equal to the cell quality-based value (cell measurement) and/or beam-based value considered to be valid. For example, validity may mean that cell-based condition to adapt RRM measurements has been fulfilled, and the beam measurements of the said cell quality derivation or cell-based measurements are obtained. In some cases where the threshold value used for cell quality derivation and beam based condition evaluation may be different, UE 120 may obtain the reference beam indexes/values according to the used threshold.

In some embodiments, the at least one reference value may be at least one beam index configured to derive at least one cell measurement quantity. In various embodiments, the at least one reference value may be the top N-beam indexes measured and/or the highest N-beams above at least one threshold. The threshold used for determining that the beam based condition may be a cell quality derivation threshold or an alternative threshold. An alternative threshold may also be derived using the cell quality derivation thresholds, such as by using an offset that may be positive, negative, or zero in absolute power values or in dBs). In certain embodiments, the at least one reference value may be at least one measured quantity value configured for cell-based measurements, which may be either L3-filtered or non-L3-filtered. Additionally or alternatively, the at least one reference value may be at least one measured quantity value configured for beam-based/cell-based measurements, which may be either L3-filtered or non-L3-filtered.

In step 203, the UE may begin at least one timer T from time 0. For example, the at least one timer T from time 0 may be started, restarted, or reset. In some embodiments, at least one timer T may be started before the at least one reference value is determined in step 201. Alternatively, at least one timer T may be started when at least one measurement configured to be compared to the at least one reference value is obtained. In various embodiments, the at least one timer T may be started when at least one cell-based condition is evaluated, and/or at least one cell- and/or beam-based condition may share the at least one timer T. For example, the at least one timer T may be configured to evaluate at least one cell- and/or at least one beam-based condition.

In various embodiments, the at least one timer T may not be started when, for example, at least one cell-based measurement or beam-based measurement is evaluated to be invalid for a reference value. For example, the evaluation criteria may include one or more of the cell qualities being lower than at least one quality threshold (or subsequent or set of cell quality measurements have variation above threshold value or the variation is negative) and at least one beam-based measurement needing to fulfill criteria, such as where at least N beams are above at least one threshold. Alternatively, the UE may begin to evaluate beam-based conditions when a cell based condition is fulfilled, such as a subsequent or set of cell quality measurements have variation above threshold value or the variation is negative. In one example, the reference value for the beam-based condition is evaluated together with cell based condition, or a beam based condition is started to evaluate when a cell based condition applies. In one example, the cell based and/or beam based conditions may both need to be fulfilled in order to determine that conditions apply or is required that timer T to start evaluation is started; for example, it may also mean that a reference value is obtained once both of the conditions are satisfied are first satisfied and monitored for the duration of at least timer T or other timer. Furthermore, the at least one timer T may be started when the UE begins evaluating at least one condition for determining whether to relax/adapt its operation for power saving purposes (e.g., relax RRM measurements) or entering a low/stationary mobility state. In some cases, the UE may determine to be in a cell edge or not to be in a cell edge.

In one example, when the UE has determined or is configured with parameters to determine that it may operate in power saving mode in low mobility state/stationary state or in a state where the UE may adapt its operation, the UE may adapt its operation parameters, such as RRM measurement or beam management parameters it may be configured with, the UE may adapt various parameters regarding its operation including measurement period, measurement bandwidth, measurement quantity (e.g., RSRP, SINR, RSRQ or the like), number of measured intra- and/or inter-frequency layers, number or measured cells, and number of measured reference signals such as SS/PBCH block. Operation parameters may be for L3 RRM measurements, L3 mobility (such as inter-cell mobility), and/or for beam management. Furthermore, the operation parameters may refer to e.g. number of component carriers configured/activated/used for UE, number of MIMO layers, operation bandwidth for DL or UL or for UL and DL, number of configured/active bandwidth parts aggregated bandwidth, length of a DRX cycle (idle/inactive, or long/short in connected mode. In further examples the operation parameters may comprise of number of CORESETs (Control Resource Sets for PDCCH reception), active TCI states for PDCCH/PDSCH/PUCCH/PUSCH search space periodicity/bandwidth/number of blind decoding, control channel element aggregation levels, or the like. These are merely examples.

In some embodiments, at least one period of time associated with the at least one timer T may be started whenever one or more of the UE performs at least one serving cell measurement, such as when the UE derives at least one new cell measurement quantity (cell quality value); the UE performs at least one measurement, such as at least one serving cell measurement, to evaluate at least one condition nor criteria to relax measurements, allowing the UE to relax measurement or evaluate conditions to relax RRM measurements and perform at least one measurement; the UE receives at least one trigger signal, such as DCI/MAC CE/RRC signaling, allowing the UE to relax measurements; and the UE performs measurements within at least one network configured time window. Additionally or alternatively, the at least one timer T may be associated with a period of time which is a sliding time window, wherein whenever a condition is not fulfilled, the at least one timer T is restarted; when the at least one timer T is restarted, the most recent measurement value may be set as the reference value. In some embodiments, the period of time may be a static window, where the at least one timer T is not started or restarted despite at least one condition being fulfilled or unfulfilled. In certain embodiments, by performing at least one measurement which may be considered as a reference value, the at least one timer T may be started.

In step 205, the UE may perform at least one measurement and/or obtain at least one value. In some embodiments, the UE may obtain at least L measurements to determine at least one cell- or beam-based condition, wherein L measurements are performed within the at least one time period T. The UE may perform L measurements in total, where either L measurements are performed, or at least one measurement has been made within the period T. In some embodiments, the at least one condition may be evaluated together with at least one beam-based condition and/or at least one cell-based condition.

In step 207, the UE may compare the performed at least one measurement and/or obtained at least one value, for example, one or more of cell-based and beam-based values, to at least one reference value.

In step 209, the UE may determine whether at least one beam has changed. In some embodiments, if the UE determines that at least one beam change has occurred, the UE may continue obtaining at least one additional reference value (e.g. beam indexes/quality or cell quality) in step 201, and/or may stop/start/restart/suspend the at least one timer T. Otherwise, the UE may proceed to step 211.

In some embodiments, the at least one beam may be determined to not be changed if, for example, the beams are changed for a cell measurement quantity derivation for different measurements in comparison to at least one reference value or other measurement. Specifically, this determination may be made if at least one beam index used to derive cell measurement quantity (cell quality) has changed; if none of the beam indices have changed; if N of M beam indices have changed; and may be based upon one or more of any of the measurement within a period of time, a previous measurement within a period of time, the at least one reference value, and the at least one reference value within a period of time.

In various embodiments, if there has been at least K beam changes and/or K beam changes within a period of time T after the UE has derived the cell measurement quantity, the UE may consider the beam based condition not to be fulfilled, may consider that it cannot adapt/relax measurements, and/or may consider the UE not to be in a low mobility state. Alternatively, if there has been a maximum of K beam changes and/or K beam changes within a period of time T after the UE has derived the cell measurement quantity, the UE may consider the beam-based condition to be fulfilled, consider that it can adapt/relax measurements, and/or consider the UE to be in a low mobility state.

In some embodiments, at least one condition to evaluate at least one beam-based criteria/condition may require that at least one or all beams configured for deriving at least one cell measurement quantity is with K dB of a highest-measured value. For example, the highest-measured value may need to be above at least one threshold, such as absThreshSS-Blocks Consolidation or other threshold. Additionally or alternatively, all of the beams used to derive the cell quality, and/or considered for evaluation of beam-based conditions, may need to be above at least one predetermined threshold, such as absThreshSS-BlocksConsolidation or other threshold. Finally, at least N beam quantities may be required to be within K dB of at least one highest measured value.

In some embodiments, when determining whether at least one change condition for the beams used for cell measurement quantity derivation has occurred, an alternative or additional threshold value may be used. For example, this alternative or additional threshold value may be derived from absThreshSS-BlocksConsolidation by using an offset, and/or it may be a separately configured or separately set threshold. In various embodiments, when the UE determines that beam change conditions are satisfied, the UE may use the threshold to determine which beams are considered in the evaluation, for example, that the beam is above at least one threshold, which may be independent to the absThreshSS-BlocksConsolidation.

In step 211, the UE may determine whether the at least one timer T has stopped, has expired, or is running.

In step 213, the UE may, upon determining that the at least one timer T has stopped, re-determine at least one reference value configured to evaluate at least one beam change condition based on at least one measurement in step 201. In some embodiments, at any time, the at least one timer T may be stopped due to external reasons, for example, when the UE cannot relax the measurements and/or the UE cannot evaluate the conditions. Another external reason includes if a cell-based condition is evaluated separately and the condition is not fulfilled. When the at least one timer T is stopped, the UE may return to step 201.

In step 215, the UE may, upon determining that the at least one timer T is running, obtain at least one measurement and/or at least one value (e.g. beam indexes/quality or cell quality) in step 205. For example, the UE may determine that the UE still needs to evaluate the at least one condition to obtain at least one new measurement. In various embodiments, the UE may need to perform at least one (or N) measurement within a predetermined period of time to evaluate at least one condition before it may consider the at least one beam-based/cell-based condition fulfilled.

In step 217, the UE may, upon determining that the at least one timer T has expired, determine that the at least one beam change condition has been fulfilled. In addition to determining that no beam change has occurred, the UE may determine that at least one beam-based condition is fulfilled. In certain embodiments, the at least one timer T may expire, and the UE may consider the at least one condition fulfilled if other conditions apply, for example, cell-based conditions and/or a number of measurements.

In some embodiments, at least one measurement used for evaluating the at least one condition/criteria, such as the beam-based condition and/or cell-based condition, may be based upon one or more of at least one L3 filtered value; at least one value not L3 filtered, such as values obtained prior to L3 filtering; and cell-based conditions based on at least one serving cell measurement or at least one measurement on any of the cells, or measurement on a cell, configured to determine the low mobility/measurement adaptation condition to be fulfilled.

In various embodiments, the beam-based condition criteria may be considered to be fulfilled only when at least X beams are used for cell quality derivation in any of the measurement for deriving the cell measurement quantity. Using the at least one beam for cell quality may or not depend on at least one threshold.

In certain embodiments, the at least one change condition may be determined to not be fulfilled if, for example, the number of beam measurements, including DL RSs such as SS/PBCH block and CSI-RS, considered in the cell quality determination is less than N, and/or is a threshold amount less than the M, such as the maximum to be considered, e.g. nrofSS-BlocksToAverage.

In various embodiments, the change condition may depend on the use of at least one threshold value for cell measurement quantity derivation. For example, if absThreshSS-BlocksConsolidation is not configured, the UE may use the highest measured value for cell quality derivation (i.e. one beam value determines the cell quality) and beam change is considered to occur when the one beam changes. Additionally or alternatively, the determination may depend if absThreshSS-BlocksConsolidation is configured and UE has measurement only one beam above the threshold and the beam used for derivation changes. Finally, the determination may be based on, if absThreshSS-BlocksConsolidation is configured and the UE derives the cell measurement quantity based on more than one beam, the number of changed beams conditions may apply, for example, if a network has configured a parameter (Change Beam) to determine how many beams can change in the cell quality derivation which is not considered yet a change. The parameter may apply only when one or more of more than one beam is used, at least the configured number Change Beam beams are used to derive cell quality, and if the UE derives the cell quality using lower number of beams than Change Beam, the beam change may be considered to happen when at least one beam changes.

In some embodiments, at least parameter and/or at least one condition may depend on the mode of the UE, such as whether the UE is in IDLE or INACTIVE mode. In one example, the INACTIVE or IDLE mode may have stricter or looser criteria with respect to each other for relaxing the measurements, where looser criteria may include the UE evaluating the criteria/condition with looser parameter settings, such as a shorter timer value (i.e., how long UE evaluates the condition) and/or more beam changes may occur or the relative RSRP condition for cell-based condition may have a larger value (i.e., the condition may tolerate a higher variation).

In another example, the IDLE mode parameters are derived based on INACTIVE mode parameters (such as timer values to evaluate beam/cell based conditions, or number of beam changes, thresholds used to determine beam change or the like) using an offset value or a delta value, or alternatively, INACTIVE parameters based on IDLE. A further example includes different conditions and criteria being evaluated for INACTIVE and IDLE. In a further example, the UE may be allowed to relax or adapt measurements when it is in INACTIVE, but not when it is in IDLE, and vice versa. Finally, the conditions and parameters, including timer values to evaluate beam/cell based conditions, number of beam changes, and thresholds used to determine beam changes, may be the same for IDLE and INACTIVE.

In some embodiments, both cell-based conditions, such as relative threshold, cell quality threshold, or any cell based on condition, and beam-based condition may be required together for the UE to be allowed to adapt/relax RRM measurements, or to consider itself in a low mobility state. For example, when at least one cell quality is above a specific threshold, at least one beam-based value may be set to be the reference values. In another example, if the reference value for cell quality measurement changes, the beam-based values may change, for example, at least one new reference value may be set to evaluate whether a beam-based condition is fulfilled.

The methods presented in any of the examples or embodiments herein may be used in any RRC mode, including IDLE, INACTIVE, or CONNECTED.

A further example would be where the cell-based condition, such as RSRP, is within a relative threshold, and considered to be fulfilled, but at least one beam based condition is not fulfill, such as the beams being considered to be changed as described above. In this case, the UE may consider that at least one low mobility state condition is not fulfilled, which may cause the reset of the at least one timer T since both conditions are not fulfilled. In some embodiments, at least one the beam index may be at least one of, for example, SS/PBCH index, time location index, resource index/indicator, or CSI-RS resource indicator, CSI-RS Resource Identifier/index, TCI State Identifier/spatial reference (for PDSCH, PDCCH, PUCCH, PUSCH) or any identifier that identifies downlink reference signal.

Figure 3:
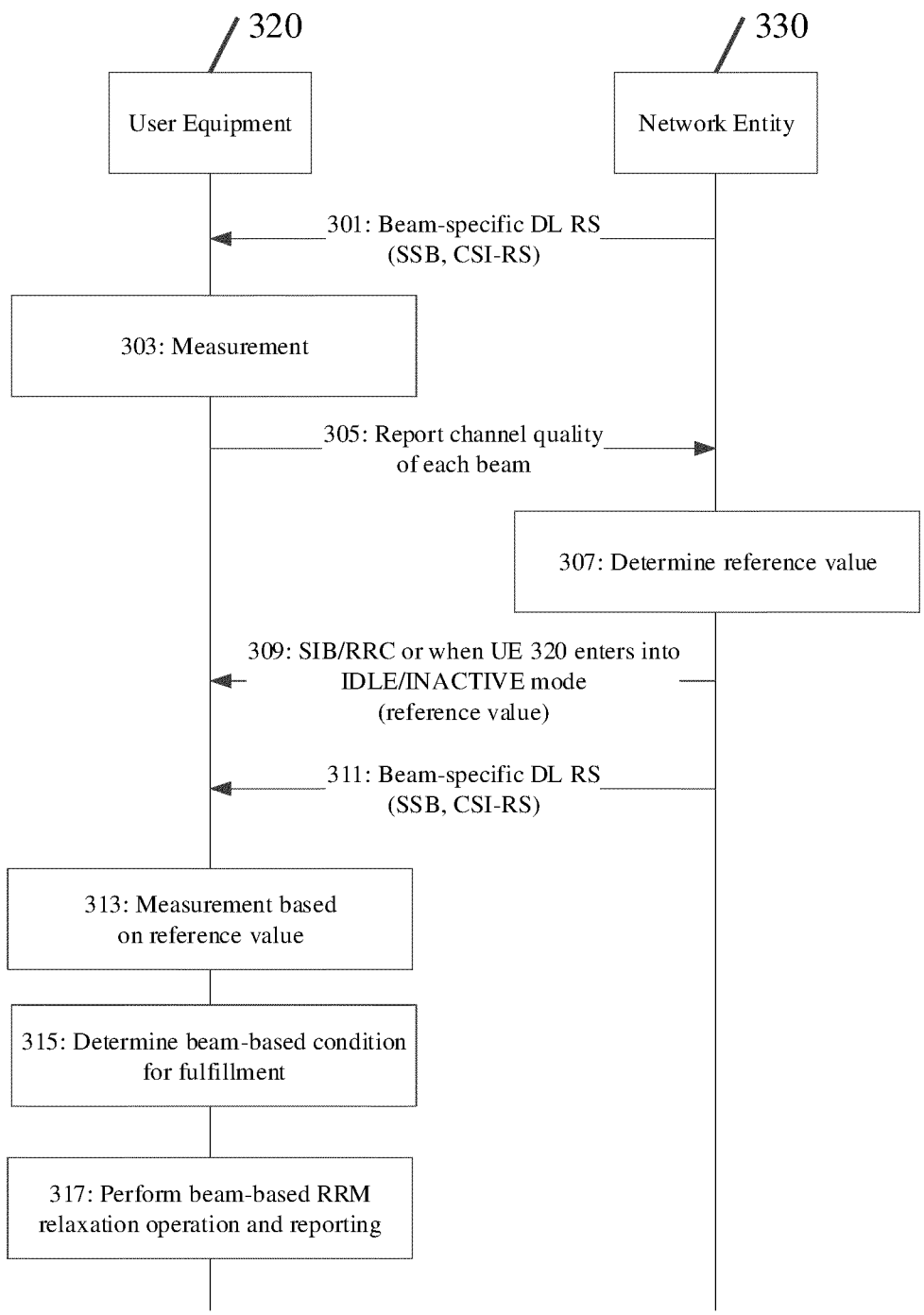
FIG. 3 illustrates an example of another signaling diagram according to certain embodiments.

FIG. 3 illustrates an example of a signaling diagram showing communications between UE 320 and NE 330 for evaluating beam-based condition/criteria. UE 320 may be UE 410, and NE 330 may be NE 420, both illustrated in FIG. 4.

In step 301, NE 330 may transmit at least one beam-specific DL RS to UE 320, such as at least one SSB and/or CSI-RS. In step 303, UE 320 may perform at least one measurement. In step 303, UE 330 may perform at least one measurement based on the received at least one beam-specific DL RS. In step 305, UE 330 may transmit at least one channel quality report of each beam based on the at least one measurement to NE 330.

In step 307, NE 330 may determine at least one reference value based on the channel quality report from UE 330. In step 309, NE 330 may transmit at least one reference value to UE 320, for example, by using at least one SIB/RRC message. Additionally or alternatively, NE 330 may transmit the at least one reference value to UE 320 upon UE 320 entering an IDLE or INACTIVE mode. In step 311, NE 320 may transmit at least one beam-specific DL RS, such as at least one SSB or CSI-RS, to UE 320.

In step 313, UE 320 may perform at least one measurement based on at least one reference value. In step 315, UE 320 may determine at least one beam-based condition configured for fulfillment. In step 317, UE 320 may perform at least one beam-based RRM relaxation and reporting operation.

FIG. 4 illustrates an example of a system according to certain embodiments. In various embodiments, a system may include multiple devices, such as, for example, user equipment 410 and/or network entity 420.

User equipment 410 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 420 may be one or more of a base station, such as an evolved node B (eNB) or 5G or New Radio node B (gNB), a serving gateway, a server, and/or any other access node or combination thereof. Furthermore, network entity 410 and/or user equipment 420 may be one or more of a citizens broadband radio service device (CBSD).

One or more of these devices may include at least one processor, respectively indicated as 411 and 421. Processors 411 and 421 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 412 and 422. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 411 and 421 and memories 412 and 422 or a subset thereof, may be configured to provide means corresponding to the various blocks of FIGS. 1-3. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 4, transceivers 413 and 423 may be provided, and one or more devices may also include at least one antenna, respectively illustrated as 414 and 424. The device may have many antennas, such as an array of antennas configured for multiple input multiple output (MIMO) communications, or multiple antennas for multiple radio access technologies. Other configurations of these devices, for example, may be provided. Transceivers 413 and 423 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-3). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-3. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

| Partial Glossary | |
| --- | --- |
| 3GPP | 3rd Generation Partnership Project |
| BS | Base Station |
| CE | Control Element |
| CSI-RS | Channel State Information Reference Signals |
| DCI | Downlink Control Information |
| DL | Downlink |
| eMBB | Enhanced Mobile Broadband |
| eNB | Evolved Node B |
| EPS | Evolved Packet System |
| gNB | Next Generation Node B |
| GPS | Global Positioning System |
| LTE | Long-Term Evolution |
| MAC | Medium Access Control |
| NR | New Radio |
| NZP | Non-Zero Power |
| PBCH | Physical Broadcast Channel |
| RAN | Radio Access Network |
| RAT | Radio Access Technology |
| RRM | Radio Resource Management |
| RS | Reference Signal |
| RSRP | Reference Signals Received Power |
| RSRQ | Reference Signal Received Quality |
| SIB | System Information Block |
| SINR | Signal to Interference & Noise Ratio |
| SMTC | Synchronization Signal/Physical Broadcast Channel Block Measurement Time Configuration |
| SSB | Synchronization Signal/Physical Broadcast Channel Block |
| TCI | Transmission Configuration Indication |
| TS | Technical Specification |
| UE | User Equipment |
| UL | Uplink |
| URLLC | Ultra-Reliable and Low-Latency Communication |
| WLAN | Wireless Local Area Network |

According to a first embodiment, an apparatus may include at least one processor and at least one memory including computer program code. The at least one memory and the computer program code can be configured to, with the at least one processor, cause the apparatus to at least determine at least one reference value configured to evaluate at least one beam change condition based on at least one measurement. The at least one memory and the computer program code can be further configured to, with the at least one processor, cause the apparatus to at least determine whether at least one beam has changed. The at least one memory and the computer program code can be further configured to, with the at least one processor, cause the apparatus to at least, upon determining that the at least one timer T has expired, determine that the at least one beam change condition has been fulfilled.

In a variant, the apparatus may further configured to start at least one timer T once at least one reference value is obtained, wherein the reference value is based upon at least one measurement configured to derive one or more of at least one cell measurement quantity configured for cell quality derivation and at least one beam index configured for cell quality derivation.

In a variant, the apparatus may be further configured to receive at least one measurement and/or at least one value.

In a variant, the apparatus may be further configured to compare the received at least one measurement and/or at least one value to at least one reference value.

In a variant, the apparatus may be further configured to determine whether the at least one timer T has stopped, has expired, or is running.

In a variant, the apparatus may be further configured to, upon determining that the at least one timer T has stopped, re-determine at least one reference value configured to evaluate at least one beam change condition based on at least one measurement.

In a variant, the apparatus may be further configured to, upon determining that the at least one timer T is running, re-receive at least one measurement and/or at least one value.

According to a second embodiment, a method may be performed according to the first embodiment and/or any of its variants.

According to a third embodiment, an apparatus can include means for performing the method according to the first embodiment and/or any of its variants.

According to a fourth embodiment, a computer program product may encode instructions for performing a process including a method according to the first embodiment and/or any of its variants.

According to a fifth embodiment, a non-transitory computer-readable medium may encode instructions that, when executed in hardware, perform a process including a method according to the first embodiment and/or any of its variants.

According to a sixth embodiment, a computer program code may include instructions for performing a method according to the first embodiment and/or any of its variants.

According to a seventh embodiment, an apparatus may include circuitry configured to perform a process including a method according to the first embodiment and/or any of its variants.

We claim:

1. An apparatus comprising:
at least one processor; and
at least one memory including computer program code, the memory and the computer program code being configured to, with the at least one processor, cause the apparatus to at least:
determine at least one reference value configured to evaluate a beam change condition based on at least one measurement, wherein the determining comprises determining the at least one reference value based on measurements configured to derive at least one cell measurement quantity configured for cell quality derivation, at least one beam index determined to be used for cell quality derivation, a number of beams configured for cell quality derivation, and a measured quantity of the beams;
initiate at least one timer;
perform the at least one measurement before the at least one timer has expired;
compare the at least one measurement to the reference value;
based on the comparing, determine whether at least one beam has changed;
upon determining whether the at least one beam has changed, determine that the at least one timer is still running;
based on the at least one timer still running, perform the at least one measurement again to obtain an updated measurement;
comparing the updated measurement to the reference value;
based on the comparing, determine that the at least one beam has changed;
upon determining that the at least one timer has expired, determine that the at least one beam change condition has been fulfilled; and
upon determining that that the at least one beam change condition has been fulfilled:
  determine that a user equipment is in a low mobility state; and
  adapting an operation for the user equipment to perform radio resource measurement that the user equipment.

2. The apparatus of claim 1, wherein the at least one memory and the computer program code further configured to start the at least one timer once the at least one reference value is obtained.

3. The apparatus of claim 1, wherein the at least one memory and the computer program code further configured to:
  based on the comparing, determine that a beam-based condition has not been fulfilled; and
  based on determining that the beam-based condition has not been fulfilled, perform the following: i) obtain a new reference value based on a latest measurement where the beam change occurred, ii) obtain the new reference value based on the latest measurement where the beam change occurred when a cell based condition is fulfilled, iii) obtain a new reference value based on the latest measurement where a cell based condition is fulfilled, and iv) suspend evaluation of beam-based conditions until evaluation is restarted.

4. The apparatus of claim 3, wherein the at least one memory and the computer program code further configured to, upon determining that the beam-based condition has not been fulfilled, starting a second timer.

5. The apparatus of claim 4, wherein the at least one memory and the computer program code further configured to determine to continue evaluating whether the beam-based conditions apply after adapting the operation for the user equipment to perform radio resource measurement that the user equipment.

6. The apparatus of claim 5, wherein the at least one memory and the computer program code further configured to, upon determining that the at least one timer T has stopped, re-determine at least one reference value configured to evaluate at least one beam change condition based on the at least one measurement.

7. The apparatus of claim 6, wherein the at least one memory and the computer program code further configured to exit the adapting if one beam has changed or is different compared to the reference value.

8. A system comprising:
an apparatus:
at least one processor; and
at least one memory including computer program code, the at least one memory and the computer program code being configured to, with the at least one processor, cause the apparatus to at least:
  determine at least one reference value configured to evaluate a beam change condition based on at least one measurement, wherein the determining comprises determining the at least one reference value based on measurements configured to derive at least one cell measurement quantity configured for cell quality derivation, at least one beam index determined to be used for cell quality derivation, a number of beams configured for cell quality derivation, and a measured quantity of the beams;
initiate at least one timer;
perform the at least one measurement before the at least one timer has expired;
compare the at least one measurement to the reference value;
based on the comparing, determine whether at least one beam has changed;
upon determining whether the at least one beam has changed, determine that the at least one timer is still running;
based on the at least one timer still running, perform the at least one measurement again to obtain an updated measurement;
comparing the updated measurement to the reference value;
based on the comparing, determine that the at least one beam has changed;
upon determining that the at least one timer has expired, determine that the at least one beam change condition has been fulfilled; and
upon determining that the at least one beam change condition has been fulfilled:
  determine that a user equipment is in a low mobility state; and
  adapting an operation for the user equipment to perform radio resource measurement that the user equipment.

9. The system of claim 8, wherein the at least one memory and the computer program code further configured to start the at least one timer once the at least one reference value is obtained.

10. The system of claim 9, wherein the at least one memory and the computer program code further configured to:
  based on the comparing, determine that a beam-based condition has not been fulfilled; and
  based on determining that the beam-based condition has not been fulfilled, perform the following: i) obtain a new reference value based on a latest measurement where the beam change occurred, ii) obtain the new reference value based on the latest measurement where the beam change occurred when a cell based condition is fulfilled, iii) obtain a new reference value based on the latest measurement where a cell based condition is fulfilled, and iv) suspend evaluation of beam-based conditions until evaluation is restarted.

11. The system of claim 10, upon determining that the beam-based condition has not been fulfilled, starting a second timer.

12. The system of claim 11, wherein the at least one memory and the computer program code further configured to determine to continue evaluating whether the beam-based conditions apply after adapting the operation for the user equipment to perform radio resource measurement that the user equipment.

13. The system of claim 12, wherein the at least one memory and the computer program code further configured to, upon determining that the at least one timer T has stopped, re-determine at least one reference value configured to evaluate at least one beam change condition based on the at least one measurement.

14. The system of claim 12, wherein the at least one memory and the computer program code further configured to exit the adapting if one beam has changed or is different compared to the reference value.

15. A method comprising:
   determining at least one reference value configured to evaluate a beam change condition based on at least one measurement, wherein the determining comprises determining the at least one reference value based on measurements configured to derive at least one cell measurement quantity configured for cell quality derivation, at least one beam index determined to be used for cell quality derivation, a number of beams configured for cell quality derivation, and a measured quantity of the beams;
   initiating at least one timer;
   performing the at least one measurement before the at least one timer has expired;
   comparing the at least one measurement to the reference value;
   based on the comparing, determining whether at least one beam has changed;
   upon determining whether the at least one beam has changed, determining that the at least one timer is still running;
   based on the at least one timer still running, performing the at least one measurement again to obtain an updated measurement;
   comparing the updated measurement to the reference value;
   based on the comparing, determining that the at least one beam has changed;
   upon determining that the at least one timer has expired, determining that the at least one beam change condition has been fulfilled; and
   upon determining that that the at least one beam change condition has been fulfilled:
      determining that a user equipment is in a low mobility state; and
      adapting an operation for the user equipment to perform radio resource measurement that the user equipment.

16. The method of claim 15, further comprising starting the at least one timer once the at least one reference value is obtained.

17. The method of claim 16, further comprising:
   based on the comparing, determining that a beam-based condition has not been fulfilled; and
   based on determining that the beam-based condition has not been fulfilled, performing the following: i) obtain a new reference value based on a latest measurement where the beam change occurred, ii) obtain the new reference value based on the latest measurement where the beam change occurred when a cell based condition is fulfilled, iii) obtain a new reference value based on the latest measurement where a cell based condition is fulfilled, and iv) suspend evaluation of beam-based conditions until evaluation is restarted.

18. The method of claim 17, further comprising upon determining that the beam-based condition has not been fulfilled, starting a second timer.

19. The method of claim 18, further comprising determining to continue evaluating whether the beam-based conditions apply after adapting the operation for the user equipment to perform radio resource measurement that the user equipment.

20. The method of claim 19, further comprising exit the adapting if one beam has changed or is different compared to the reference value.

* * * * *